United States Patent [19]
Van Beek et al.

[11] Patent Number: 5,936,671
[45] Date of Patent: Aug. 10, 1999

[54] OBJECT-BASED VIDEO PROCESSING USING FORWARD-TRACKING 2-D MESH LAYERS

[75] Inventors: Petrus J. L. Van Beek; Ahmet M. Tekalp, both of Rochester, N.Y.

[73] Assignee: Sharp Laboratories of America, Inc., Camas, Wash.

[21] Appl. No.: 08/886,871

[22] Filed: Jul. 2, 1997

Related U.S. Application Data

[60] Provisional application No. 60/021,093, Jul. 2, 1996.

[51] Int. Cl.$^6$ ........................................................ H04N 7/36
[52] U.S. Cl. ............................ 348/413; 348/699; 382/236
[58] Field of Search .................................. 348/402, 413, 348/416, 699; 382/236

[56] References Cited

U.S. PATENT DOCUMENTS 5,719,629  2/1998  Chun ........................................ 348/416

OTHER PUBLICATIONS

Y. Altunbasak, A. M. Tekalp and G. Bozdagi, "Two–dimensional object based coding using a content–based mesh and affine motion parameterization," *IEEE Int. Conference on Image Processing*, Washington DC, Oct. 1995.

Y. Altunbasak and A. M. Tekalp, "Occlusion–adaptive 2–D mesh tracking," *Proc. ICASSP '96*, Atlanta, GA, May 1996.

Y. Altunbasak and A. M. Tekalp, "Very–low bitrate video coding using object–based mesh design and tracking," *Proc. SPIE/IS&T Electronic Imaging, Science and Technology*, San Jose, CA, Feb. 1996.

P. J. L. van Beek and A. M. Tekalp, "Object–based video coding using forward tracking 2–D mesh layers," *Visual Communications and Image Processing '97*, San Jose, CA, Feb. 1997.

L. Chiariglione, "MPEG and multimedia communications," *IEEE Trans. on Circ. and Syst. for Video Technology*, vol. 7, No. 1, pp. 5–18, Feb. 1997.

D. Hearn and M. P. Baker,"*Computer Graphics*," second edition, Prentice Hall, 1997.

B. Lucas and T. Kanade, "An iterative registration technique with an application to stereo vision," *Proc. DARPA Image Understanding Workshop*, pp. 121–130, 1981.

Y. Nakaya and H. Harashima, "Motion compensation based on spatial transformations," *IEEE Trans. on Circuits and Systems for Video Technology*, vol. 4, No. 3, pp. 339–356, Jun. 1994.

J. Nieweglowski, T. G. Campbell and P. Haavisto, "A novel video coding scheme based on temporal prediction using digital image warping," *IEEE Transactions on Consumer Electronics*, vol. 39, No. 3, pp. 141–150, Aug. 1993.

(List continued on next page.)

*Primary Examiner*—Howard Britton
*Attorney, Agent, or Firm*—Kolisch, Hartwell, Dickinson, McCormack & Heuser

[57] ABSTRACT

The invented method involves the object-based processing of parts of video frames referred to as Video Object Planes using 2-D meshes, wherein the color and shape information associated with the Video Object Planes are assumed to be known at every frame and wherein each video object is processed independently. The invented method more particularly involves utilization of the Alpha Planes, which contain the shape information, in object-based design of an initial 2-D mesh, wherein an Alpha Plane is used to form a constraining polygonal mesh boundary, as well as in object-based tracking of mesh node points, wherein motion vectors of nodes on the mesh boundary are constrained so that these node points always lie along the Alpha Plane boundary, by means of restriction of the search space or back-projection, and mesh-based Video Object Plane mapping takes into account any differences between the mesh boundary and the Video Object Plane boundary. Such invented methods may be computer-implemented or computer-assisted, as by being coded as software within any coding system as memory-based instructions executed by a microprocessor, PC or mainframe computer, or may be implemented in hardware such as a state machine.

9 Claims, 5 Drawing Sheets

OTHER PUBLICATIONS

J. R. Shewchuk, "Triangle: Engineering a 2D quality mesh generator and Delaunay traingulator," *First Workshop on Applied Computational Geometry*, pp. 124–133, ACM, Philadelphia, May 1996.

T. Sikora, "The MPEG–4 Video Standard Verification Model," *IEEE Trans. on Cir. and Syst. for Video Technology*, vol. 7, No. 1, pp. 19–31, Feb. 1997.

G. J. Sullivan and R. L. Baker, "Motion compensation for video compression using control grid interpolation," *Proc. ICASSP '91*, vol. 4, pp. 2713–2716, May 1991.

A. M. Tekalp, *"Digital Video Processing,"* Prentice Hall, 1995.

J. Y. A. Wang and E. H. Adelson, "Representing moving images with layers," *IEEE Transactions on Image Processing*, vol. 3, No. 5, pp. 625–638, Sep. 1994.

C. Toklu, A. T. Erdem, and A. M. Tekalp, "2–D Mesh–based synthetic transfiguration of an object with occlusion," *Proc. ICASSP '97*, Munich, Germany, Apr. 1997.

C. Toklu, A. M. Tekalp, and A. T. Erdem, "2–D Triangular mesh–based mosaicking for object tracking in the presence of occlusion," *Visual Communication and Image Processing '97*, San Jose, CA, Feb. 1997.

C. Toklu, A. T. Erdem, M. I. Sezan and A. M. Tekalp, "Tracking motion and intensity variations using hierarchical 2–D mesh modeling," *Graphical Models and Image Processing*, vol. 58, No. 6, pp. 553–573, Nov. 1996.

K. Wall and P. E. Danielsson, "A fast sequential method for polygonal approximation of digitized curves," *Comp. Graphics, Vision and Im. Processing*, vol. 28, pp. 229–227, 1984.

Y. Wang and O. Lee, "Active mesh —A feature seeking and tracking image sequence representation scheme," *IEEE Transactions on Image Processing*, vol. 3, No. 5, pp. 610–624, Sep. 1994.

(a)

(b)

(c)

OBJECT-BASED VIDEO PROCESSING USING FORWARD-TRACKING 2-D MESH LAYERS

CROSS REFERENCE TO RELATED APPLICATION

This application claims priority from U.S. provisional patent application Ser. No. 60/021,093, filed on Jul. 2, 1996, the disclosure of which is incorporated hereby by this reference.

TECHNICAL FIELD

The present invention relates generally to object-based video processing techniques. More particularly, it concerns a method of video processing that enhances video data representation, storage and transmission in systems utilizing, for example, chroma-keying to extract meaningful parts from video data. The method preferably is hardware- or computer-implemented or hardware- or computer-assisted, and may for example be coded as software or firmware into existing system software executed by a microprocessor, personal computer (PC) or mainframe computer or may be implemented in hardware such as a state machine or application-specific integrated circuit (ASIC) or other device or devices.

BACKGROUND ART

Known background publications include the following references, familiarity with which is assumed, which references are incorporated herein by this reference.

[1] Y. Altunbasak, A. M. Tekalp and G. Bozdagi, "Two-dimensional object based coding using a content-based mesh and affine motion parameterization," *IEEE Int. Conference on Image Processing*, Washington D.C., October 1995.

[2] Y. Altunbasak and A. M. Tekalp, "Occlusion-adaptive 2-D mesh tracking," *Proc. ICASSP '96*, Atlanta, Ga., May 1996.

[3] Y. Altunbasak and A. M. Tekalp, "Very-low bitrate video coding using object-based mesh design and tracking," *Proc. SPIE/IS&T Electronic Imaging, Science and Technology*, San Jose, Calif., February 1996.

[4] P. J. L. van Beek and A. M. Tekalp, "Object-based video coding using forward tracking 2-D mesh layers," *Visual Communications and Image Processing '97*, San Jose, Calif., February 1997.

[5] L. Chiariglione, "MPEG and multimedia communications," *IEEE Trans. on Circ. and Syst. for Video Technology*, vol. 7, no. 1, pp. 5–18, February 1997.

[6] D. Hearn and M. P. Baker, *"Computer Graphics,"* second edition, Prentice Hall, 1997.

[7] B. Lucas and T. Kanade, "An iterative registration technique with an application to stereo vision," *Proc. DARPA Image Understanding Workshop*, pp. 121–130, 1981.

[8] Y. Nakaya and H. Harashima, "Motion compensation based on spatial transformations," *IEEE Trans. on Circuits and Systems for Video Technology*, vol. 4, no. 3, pp. 339–356, June 1994.

[9] J. Nieweglowski, T. G. Campbell and P. Haavisto, "A novel video coding scheme based on temporal prediction using digital image warping," *IEEE Transactions on Consumer Electronics*, vol. 39, no. 3, pp. 141–150, August 1993.

[10] J. R. Shewchuk, "Triangle: Engineering a 2D quality mesh generator and Delaunay triangulator," *First Workshop on Applied Computational Geometry*, pp. 124–133, ACM, Philadelphia, May 1996.

[11] T. Sikora, "The MPEG-4 Video Standard Verification Model," *IEEE Trans. on Circ. and Syst for Video Technology*, vol. 7, no. 1, pp. 19–31, February 1997.

[12] G. J. Sullivan and R. L. Baker, "Motion compensation for video compression using control grid interpolation," *Proc. ICASSP '91*, vol. 4, pp. 2713–2716, May 1991.

[13] A. M. Tekalp, "Digital Video Processing," Prentice Hall, 1995.

[14] C. Toklu, A. T. Erdem, M. I. Sezan and A. M. Tekalp, "Tracking motion and intensity variations using hierarchical 2-D mesh modeling," *Graphical Models and Image Processing*, vol. 58, no. 6, pp. 553–573, November 1996.

[15] C. Toklu, A. M. Tekalp, and A. T. Erdem, "2-D Triangular mesh-based mosaicking for object tracking in the presence of occlusion," *Visual Communication and Image Processing '97*, San Jose, Calif., February 1997.

[16] C. Toklu, A. T. Erdem, and A. M. Tekalp, "2-D Mesh-based synthetic transfiguration of an object with occlusion," *Proc. ICASSP '97*, Munich, Germany, April 1997.

[17] K. Wall and P. E. Danielsson, "A fast sequential method for polygonal approximation of digitized curves," *Comp. Graphics, Vision and Im. Processing*, vol. 28, pp. 229–227, 1984.

[18] J. Y. A. Wang and E. H. Adelson, "Representing moving images with layers," *IEEE Transactions on Image Processing*, vol. 3, no. 5, pp. 625–638, September 1994.

[19] Y. Wang and 0. Lee, "Active mesh—A feature seeking and tracking image sequence representation scheme," *IEEE Transactions on Image Processing*, vol. 3, no. 5, pp. 610–624, September 1994.

These references may be referred to herein by their bracketed number, e.g. the Nakaya, et al. article is referred to herein simply as [8].

DISCLOSURE OF THE INVENTION

Briefly summarized, the invented method involves the object-based processing of parts of video frames referred to as Video Object Planes using 2-D meshes, wherein the color and shape information associated with the Video Object Planes are assumed to be known at every frame and wherein each video object is processed independently. The invented method more particularly involves utilization of the Alpha Planes, which contain the shape information, in object-based design of an initial 2-D mesh, wherein an Alpha Plane is used to form a constraining polygonal mesh boundary, as well as in object-based tracking of mesh node points, wherein motion vectors of nodes on the mesh boundary are constrained so that these node points always lie along the Alpha Plane boundary, by means of restriction of the search space or back-projection, and mesh-based Video Object Plane mapping takes into account any differences between the mesh boundary and the Video Object Plane boundary. Such invented methods may be computer-implemented or computer-assisted, as by being coded as software within any coding system as memory-based instructions executed by a microprocessor, PC or mainframe computer, or may be implemented in hardware such as a state machine.

These and additional objects and advantages of the present invention will be more readily understood after consideration of the drawings and the detailed description of the preferred embodiment which follows.

DETAILED DESCRIPTION OF THE PREFERRED EMBODIMENT AND BEST MODE OF CARRYING OUT THE INVENTION

BACKGROUND

Object-based video representations allow for object-based compression, storage and transmission, in addition to object-based video manipulation, such as editing. Object-based video compression methods are currently being developed in the context of the MPEG-4 standardization process [5, 11]. This disclosure describes methods for object-based video motion representation using forward tracking 2-D mesh layers, where one mesh layer is used for each object.

Figure 1:
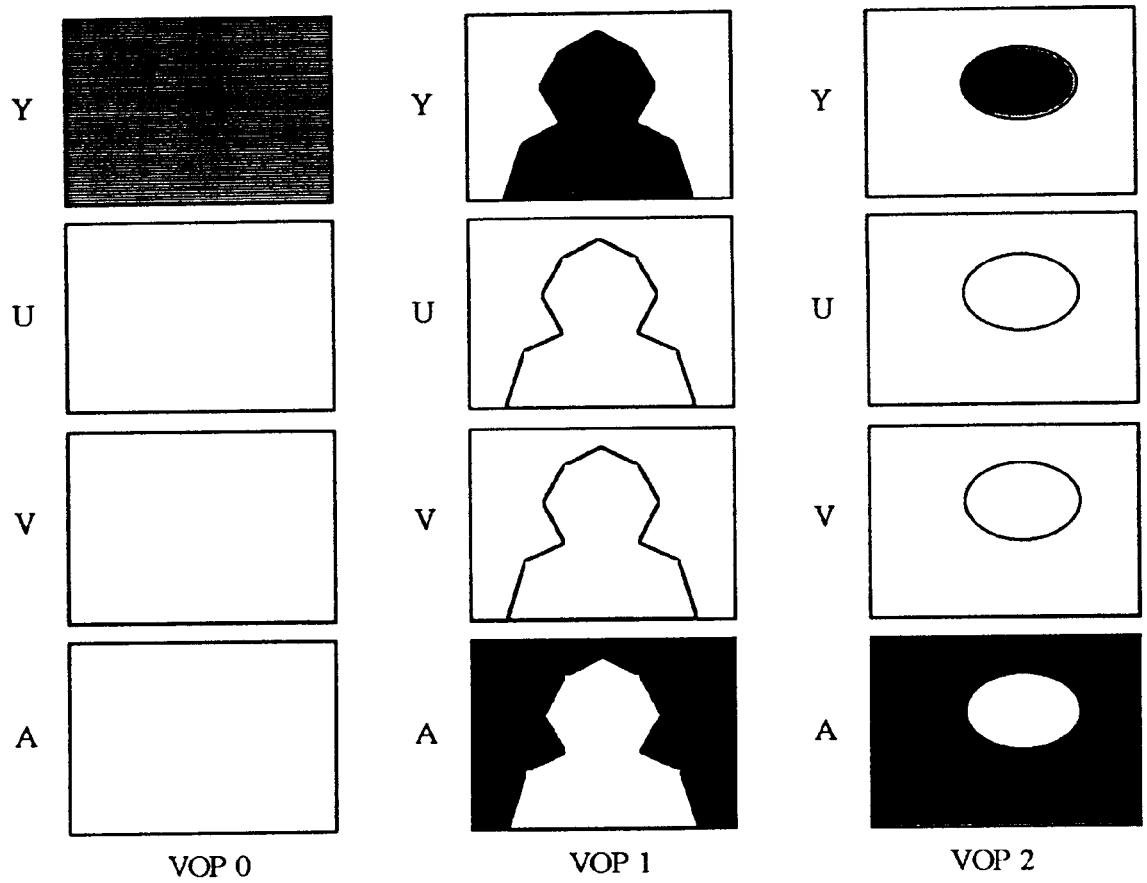
FIG. 1 illustrates the video data structure in block diagram form.

Following MPEG-4 terminology [11], a "Video Object" (VO) refers to spatio-temporal data pertinent to a particular object and a "Video Object Plane" (VOP) refers to a two-dimensional (2-D) snapshot of a Video Object at a particular time instant (similar to a video frame). Each VOP consists of a number of color components, for instance a Y, U and V component, as well as a shape component or "Alpha Plane", describing its shape and opacity. This data structure is depicted in FIG. 1. VOPs can be I, P or B type as in MPEG-1 and -2, which are previously adopted and published standards that are precursors to the developing MPEG-4 standard. Those of skill in the art will appreciate that such VOP types will be referred to herein as I-VOPs, P-VOPs and B-VOPs, respectively, corresponding to I-frames, P-frames and B-frames in the case of MPEG- 1 or -2. Note that the Alpha Planes are herein assumed to be known for every VOP in the VO. In practice, the Alpha Planes can be obtained using for example chroma-keying. Note further, that different video objects may have been acquired with different cameras. On the other hand, different video objects may have been obtained from a single camera shot, by partitioning each frame into the constituent video object planes. A layered video representation similar to the data structure described above was discussed in [18].

In brief summary, FIG. 1 may be seen to be an illustration of the data structure used in accordance with the invention. Depicted are three different video object planes (VOPs), each consisting of three color components (Y, U and V planes) and one shape component (A plane). The A- or Alpha plane represents the shape and opacity of a video object plane, i.e., it describes in which parts of the frame the color data is defined and it describes the visibility of that color data. The color data of a video object plane is fully visible in areas where the Alpha plane is white and invisible or undefined in areas where the Alpha plane is black. An Alpha plane can have other shades of gray to denote partially transparent video object planes. Each video object is processed independently from other video objects; after processing and possible encoding and transmission of each video object, they may be overlaid so as to form a composited video frame. For instance, VOP 1 may be overlaid onto VOP 0, and VOP 2 may be overlaid onto the result of the first overlay.

Mesh-based Representation of Video Object Motion

In type-I sources, also referred to herein as type-I sequences, it is assumed that the intensities at all pixels within each VOP are available for all time instances (see FIG. 1). An example of a type-I sequence is one where VOPs (other than the background) are shot by chroma-keying techniques. It will be appreciated that there are covered and uncovered VOP regions resulting from object-to-object interactions as the VOPs move independently of each other.

It is assumed that the boundary of each VOP is approximated by a polygon or a spline with a finite number of vertex or control points, respectively. We investigate object-to-object interactions and tracking of the node points along the VOP boundaries (vertex or control points) under what will be referred to herein as Case I.

Case I, as herein-defined, is concerned with processing of type-I sequences, where all VOPs, their alpha planes and composition orders are known. Here, all interaction between the VOPs, such as one VOP covering another, can be handled by using the information in the alpha planes. In reference to FIG. 5, estimation of the motion vectors for node points along the boundary of VOP1 is constrained, such that motion vectors at the boundary of VOP1 in frame k must point to the boundary of VOP1 in frame k+1. This can be achieved by restricting the search space of these motion vectors during motion estimation (e.g., block-matching or hexagonal matching). The tracking of the nodes in the background (VOP0) is performed as in [2].

Prior techniques for frame-based video processing using 2-D mesh models include [1,2,3,8,9,12,14,15,16,19]. Mesh-based motion modeling is an alternative to block-based motion modeling, which has been adopted in international video coding standards such as MPEG-1 and MPEG-2 [13]. A 2D mesh is a tessellation (or partition) of a 2D planar region into polygonal patches. The vertices of the polygonal patches are referred to as the node points of the mesh. Mostly, the polygonal patches are triangles or quadrangles, leading to triangular or quadrilateral meshes, respectively. The patches in the previous frame are deformed by the movements of the node points into polygonal patches in the current frame, and the texture inside each patch in the previous frame can be warped onto the current frame as a function of the node point motion vectors. In case of triangular patches, the warping is performed according to a six-parameter affine transform. Note that the patches overlap neither in the previous frame nor in the current frame. As such, the original 2-D motion field can be compactly represented by the motion of the mesh node points, from which a continuous, piecewise smooth motion field can be reconstructed.

An advantage of the mesh-motion model over a (translational) block-motion model is its ability to represent more general types of motions. At the same time, mesh models constrain the movements of adjacent image patches. Therefore, they are well-suited to represent mildly deformable but spatially continuous motion fields. An advantage of the block-based model is its ability to handle discontinuities in the motion field; however, such discontinuities may not always coincide with block borders. Note that a mesh-based motion field can be described by approximately the same number of parameters as a translational block-based motion field in case of an equal number of patches.

Figure 2:
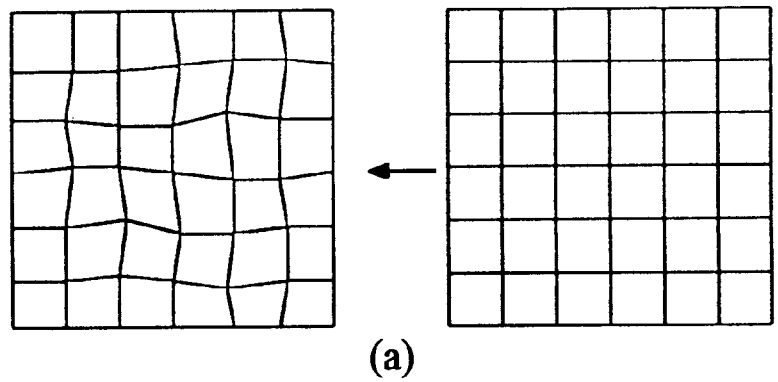
FIG. 2 illustrates object-based forward motion modeling versus frame-based forward motion modeling and frame-based backward motion modeling.
Figure 2:
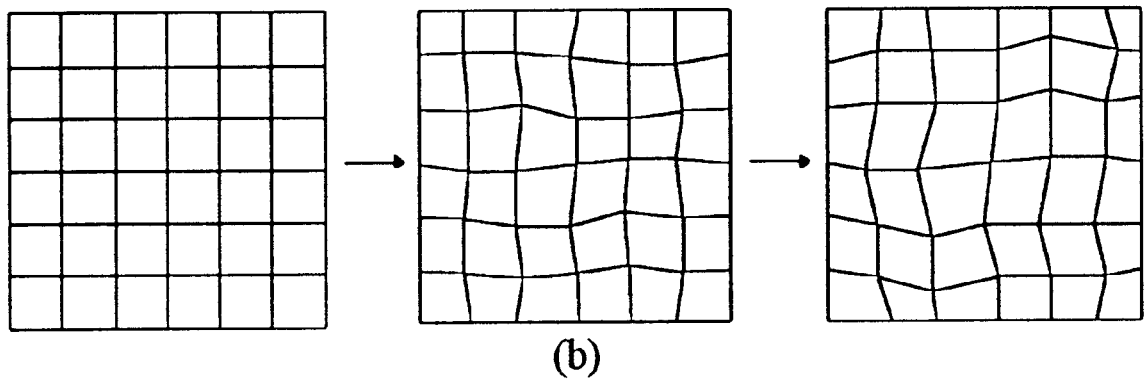
Figure 2:
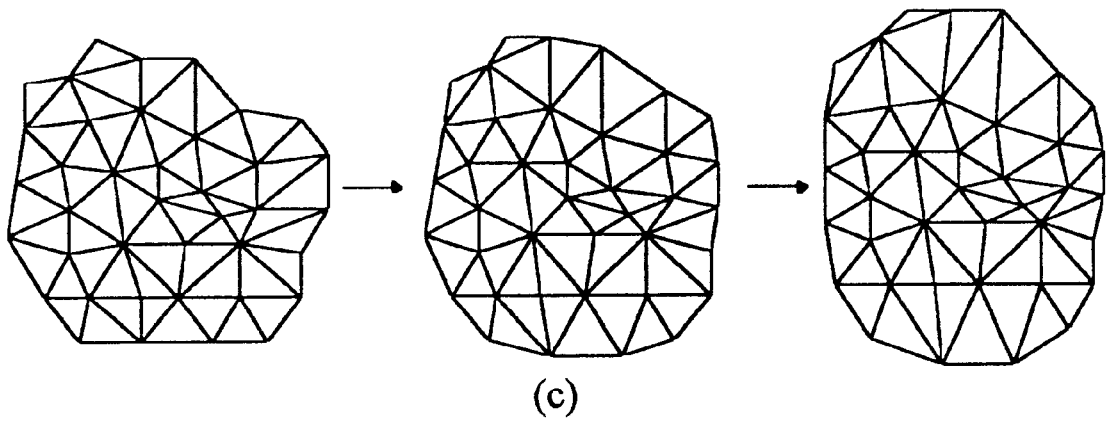

This disclosure combines recent mesh-based motion tracking and compensation methods [1,2,3,8,9,12,14] with a layered (object-based) video representation to address object-based functionalities for video processing systems in the case that Alpha Planes are available. Most prior techniques in literature address frame-based mesh modeling only. In frame-based modeling, a mesh covers the entire video frame, both in the previous and current frame. As described in this disclosure, in object-based modeling, a mesh covers only that part of a video frame that corresponds to a semantically meaningful object, captured by a Video Object Plane and delineated by an Alpha Plane. As such, each Video Object is to be processed independently. Both frame-based and object-based modeling are illustrated in FIG. 2. Methods for mesh tracking in the case that no Alpha Planes are available has been addressed in [15,16].

In brief summary, FIG. 2 will be understood to illustrate an object-based forward motion modeling (c) versus frame-based forward motion modeling (b) and frame-based backward motion modeling (a) using 2-D meshes. Meshes can be quadrilateral, as in (a) and (b), or triangular, as in (c). Triangular meshes are more convenient in representing arbitrary shaped objects, as in (c). In object-based modeling, boundaries can have arbitrary shape; these are represented by the polygonal mesh boundary as in (c). In backward motion modeling, motion vectors for the current frame are searched in the previous frame. In forward motion modeling, motion vectors for the previous frame are searched in the current frame. In the latter case, the search procedure in the next frame can be based on the motion vectors obtained in the current frame, thus tracking points of interest through the sequence.

Motion estimation methods can be classified as backward or forward estimation, see FIG. 2. The former, in the case of mesh modeling, refers to searching in a previous reference frame for the best locations of the node points that match those in the current frame. In backward mesh motion estimation, one usually sets up a new regular mesh in every frame. In forward mesh motion estimation, one sets up a mesh in a previous reference frame, and searches for the best matching locations of the node points in the current frame. This enables the system to continue to search for node motion vectors in successive frames using the most recently updated mesh, thus tracking features of interest through the entire sequence. The initial mesh may be regular, or may be adapted to the image contents, in which case it is called a content-based mesh.

In this work, forward motion estimation using content-based triangular meshes is used, because it allows for better modeling and it allows for tracking of object features through the image sequence. Mesh tracking, in turn, enables manipulation and animation of graphics and video content using texture mapping, which is a common technique in 3-D graphics systems [6]. Furthermore, the mesh-based tracking algorithm described here, can be applied in object-based video compression systems [4], achieving a common framework for object-based video compression and manipulation. We describe how a new content-based triangular mesh is designed independently for each I-VOP to be represented. We then describe how each mesh layer is tracked independently over the subsequent P-VOPs. In particular, we describe how the Alpha Planes, that are given for each VOP, are utilized in the initial mesh design as well as in the mesh tracking in a novel manner. An outline of the mesh design and tracking algorithm is depicted in FIG. 3.

Figure 3:
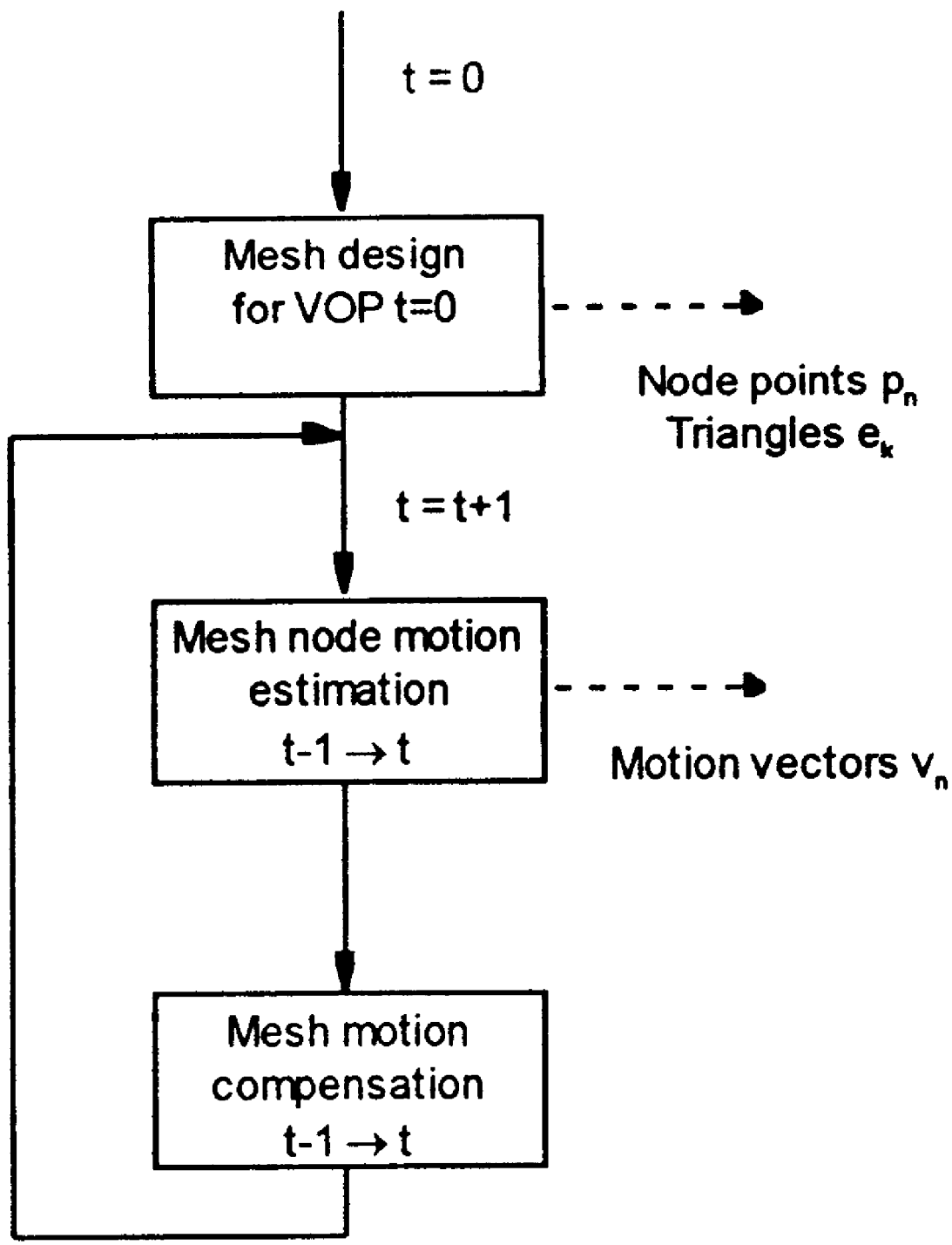
FIG. 3 depicts an overview of the object-based mesh design and tracking algorithm in block diagram form.

In brief summary, FIG. 3 will be understood to illustrate an overview of object-based mesh tracking algorithm. An initial mesh is designed on the first video object plane, at t=0. For the following video object planes, at t=1, 2, 3, etc., motion vectors of the mesh nodes are estimated, which point from the previous video object plane to the current video object plane; then, the motion vectors are applied to the nodes to motion compensate the mesh. The mesh design results in a number of node point locations $\vec{p}_n$ and triangular elements $e_k$; the mesh motion estimation results in a number of node motion vectors $\vec{v}_n$.

Object-based Mesh Design Using Alpha Plane Information

Figure 4:
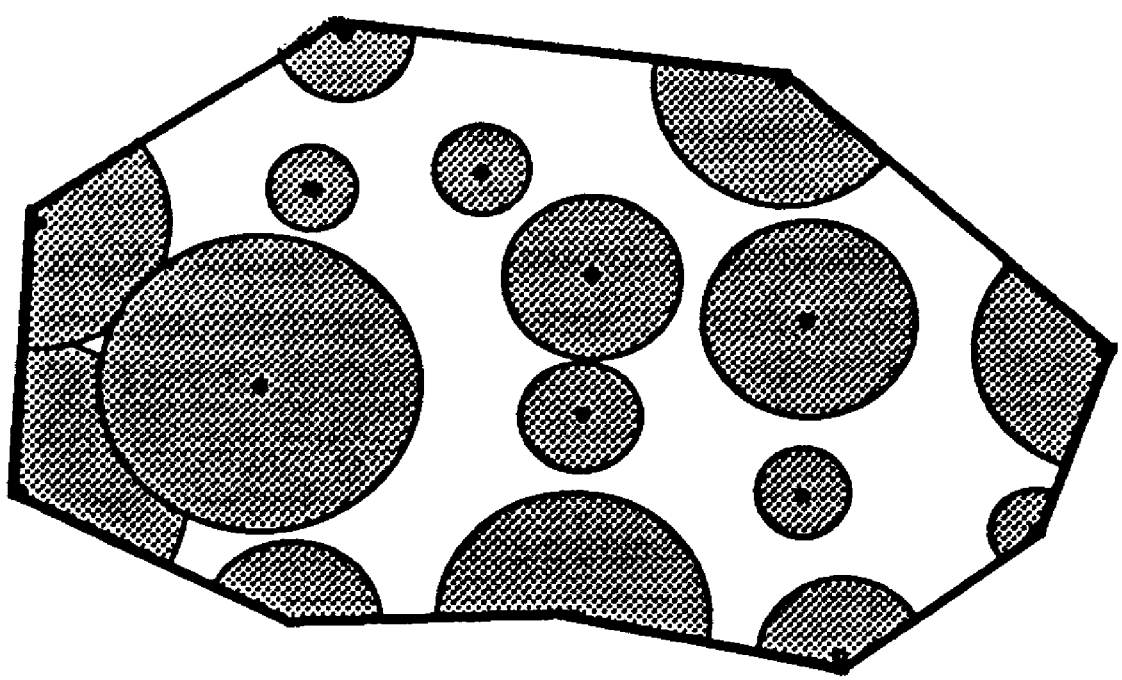
FIG. 4 illustrates the selection of mesh node points in object-based mesh design.

This section describes the design of a content-based mesh in case the Alpha Plane of the initial VOP is available [3]. It differs from the prior known frame-based mesh design algorithm [1] in the sense that the arbitrary shape of the VOP has to be represented. Firstly, node points on the boundary of the VOP are selected and secondly, interior nodes are selected, as illustrated in FIG. 4. Finally, Delaunay triangulation is applied to define the mesh triangular topology.

VOP Boundary Polygonization and Selection of Boundary Nodes

The Alpha Plane is first binarized by setting every non-zero pixel to the maximum pixel value (255) and all other pixel to the minimum pixel value (0). The boundary of the VOP is then obtained by extracting the largest connected component in the binarized Alpha Plane and tracing the pixels on its contour. Then, the boundary of the VOP is approximated by straight-line segments, together forming a polygon. The resulting polygon becomes the boundary of the object mesh layer. The vertices of the boundary polygon will serve as node points of the 2-D object mesh layer. We have used a fast sequential polygonal approximation algorithm [17] to compute the boundary polygon.

Selection of Nodes in the Interior of a VOP

Additional nodes, besides the vertices of the VOP boundary polygon, are selected within the VOP using the node selection algorithm proposed in [1]. The basic principle of this method is to place node points in such a way that triangle edges align with intensity edges and the density of node points is proportional to the local motion activity. The former is attained by placing node points on pixels with high spatial gradient. The latter is achieved by allocating node points in such a way that a predefined function of the displaced frame difference (DFD) within each triangular patch attains approximately the same value. The displaced frame difference can be computed using motion vectors estimated by conventional displacement estimation techniques.

An outline of the content-based node-point selection algorithm is as follows. An illustration is given in FIG. 4.

1. Compute an image containing the displaced frame difference inside the VOP, named DFD(x,y). For instance, this can be computed using a forward dense motion field from the previous VOP t to the current VOP t+1. In the case of video compression, this image can contain past quantized prediction error. In any case, areas in this image with high pixel values signal that either the motion cannot be estimated in that area, or that the motion is complex in that area. More nodes will be placed in these areas than in areas with displaced frame difference value, thus creating a finer motion representation in the former areas.

2. Compute a "cost function" image $C(x,y)=|I_x(x,y)|^2+|I_y(x,y)|^2$, where $I_x(x,y)$ and $I_y(x,y)$ stand for the partial derivatives of the intensity with respect to x and y coordinates evaluated at the pixel (x,y). The cost function is related to the spatial intensity gradient so that selected node points tend to coincide with spatial edges.

3. Initialize a label image to keep track of node positions and pixel labels. Label all pixels as unmarked. Denote the number of available nodes by N.

4. (Re-)compute the average displaced frame difference value, given by $$DFD_{avg} = 1/N \sum_{(x,y)} [DFD(x, y)]^P,$$

where DFD(x,y) stands for the displaced frame difference or prediction error image computed in step 1, the summation is over all unmarked pixels in the VOP, N is the number of currently available nodes, and p=2.

5. Find the unmarked pixel with the highest C(x,y) and label this point as a node point. Note that marked pixels cannot be labeled as nodes. Decrement N by 1.

6. Grow a square or circular region about this node point until the sum $\Sigma[DFD(x,y)]^P$ over the unmarked pixels in this region is greater than $DFD_{avg}$. Continue growing until the radius of this region is greater or equal than some prespecified value. Label all pixels within the as marked.

7. If N>0, go to 4; otherwise, the desired number of node points, N, is selected and the algorithm stops.

In brief summary, FIG. 4 will be understood to illustrate the node point selection procedure in object-based mesh design. The boundary of the video object plane (VOP) is approximated by a polygon, consisting of straight-line segments. The vertices of this polygon are selected as mesh boundary node points. Then, further node points are selected inside the VOP polygonal boundary. For each node point that is selected, a region is grown around the node location and pixels inside this region are marked, so that another node point cannot be placed within a marked region. Each region grows until the integral over the region of a predefined function attains a certain value. The predefined function can, for example, represent a local measure of temporal activity. Then, circular regions with small radius correspond to regions with high temporal activity, regions with large radius correspond to regions with low temporal activity. After node point selection, triangulation of the point set is applied to obtain a mesh. The straight-line segments on the polygonal mesh boundary are used as constraints in the triangulation, which guarantees that these segments become edges in the mesh and that no triangle falls outside the polygonal boundary.

The growing of marked pixels in step 6 ensures that each selected node is not closer to any other previously selected nodes than a prespecified minimum distance. At the same time, it controls the node point density in proportion to the local motion activity. In reference to FIG. 4, a small circle indicates a high temporal activity, while a large circle indicates low temporal activity.

Constrained Delaunay Triangulation

After all node points are selected, constrained Delaunay triangulation [10] is employed to construct a content-based triangular mesh within each VOP. Delaunay triangulation is a well-known technique in the computation geometry field to construct triangulations of point sets. The edges of the VOP boundary polygon are used as constraints in the triangulation, to make sure that polygon edges become triangle edges and that all triangles are inside the polygon.

Object-based Mesh Tracking Using Alpha Plane Information

This section describes a method for 2-D mesh tracking when Alpha Plane information is given and no occlusions are present in the video data. Video object tracking is a very challenging problem in general, since one needs to take into account the mutual occlusion of scene objects, which leads to covering and uncovering of object surfaces projecting into the image. However, the complexity of the object-based tracking problem depends on the type of video source at hand and the problem is simplified if the Alpha Plane information is available. We consider two different types of video sources. Type-1 sources are such that the intensities at all pixels within each Video Object Plane are available for all time instances. An example of a type-1 sequence is one where VOPs are shot by chroma-keying (blue-screening) techniques. In type-2 sources, pixel intensities in the covered parts of each VOP are not available. This case arises, for example, if the VOPs are extracted from a single camera shot (usually by user interaction). In order to track multiple triangular meshes over a sequence of VOPs, in general one needs to take covering and uncovering of objects into account. In the following, we discuss tracking of the VO mesh node points only for sequences without any occlusion, where all VOP intensities, their Alpha Planes, and composition orders are known. Here, each VO sequence is processed and compressed independently. Given the assumption that there is no occlusion in a VO, the Alpha Planes can be effectively used to constrain the motion of mesh node points, simplifying the mesh tracking problem significantly.

An overview of the mesh tracking procedure can be given by the block diagram shown in FIG. 3. The tracking algorithm implements the following steps: given the mesh in the previous VOP, a forward motion vector (between the previous and current VOPs) is estimated for each node point. These motion vectors are applied to the mesh nodes to obtain a mesh at the current VOP. The meshes at the previous and current VOPs can be used to warp the pixel-texture of the mesh elements (patches) from the previous VOP to the current VOP.

Node Motion Vector Estimation

Motion estimation is done in all P-VOPs (not in an I-VOP) in order to propagate a mesh from the previous VOP to the current VOP. For all the mesh node points, a motion vector has to be computed using forward estimation. Motion vectors of node points inside a VOP can be estimated in several ways [13], such as block matching, generalized block matching, gradient-based methods, hexagonal matching. We have used either full-search block-matching or a hierarchical version of the gradient-based method of Lucas and Kanade [7] to estimate the motion at locations of node points; and hexagonal matching [8] for motion vector refinement. In the case of block-matching, a square block of pixels is centered on the node point location in the previous VOP and the best matching block of pixels in the current VOP is found by searching candidate locations inside a search window. The best match is defined by the use of an error criterion, such as the Sum of Absolute Differences (SAD) between pixels of the reference block and pixels of the candidate block. In the case of gradient-based motion estimation, a dense motion field is first computed in the entire VOP which is then sampled at the locations of the mesh nodes. Note that prior to motion estimation, the previous and current VOPs are padded beyond its boundaries. For nodes which are close to the VOP boundary, only YUV data of that VOP is taken into account.

The motion estimation of node points on mesh boundaries is constrained such these nodes always fall on the actual VOP boundary. For example, in reference to FIG. 5, the motion vectors of nodes at the boundary of the shown VOP at time t must point to a point on the boundary of this VOP at time t'. This can be achieved by restricting the search space during motion estimation or by projecting the boundary nodes onto the actual boundary after motion estimation. Since both block-based node motion estimation and hexagonal matching are search-based, the constraint provided by the VOP boundary can be enforced by restricting the search to candidate node locations on the VOP boundary. Gradient-based motion estimation is not search-based, so the new node location, obtained by applying the computed motion vector to the old node location, must be projected back onto the VOP boundary. This is done by projecting the node onto the VOP boundary point that has the minimum distance to the initially computed node location. Further constraining is necessary in both the search-based and gradient-based techniques to ensure that the polygonal boundary will not self-intersect after the motion vectors are applied to the nodes. This means that the ordering of consecutive boundary node points may not change from one time instant to the next. The motion estimation of nodes interior to the mesh is not constrained in the above manner.

Figure 5:
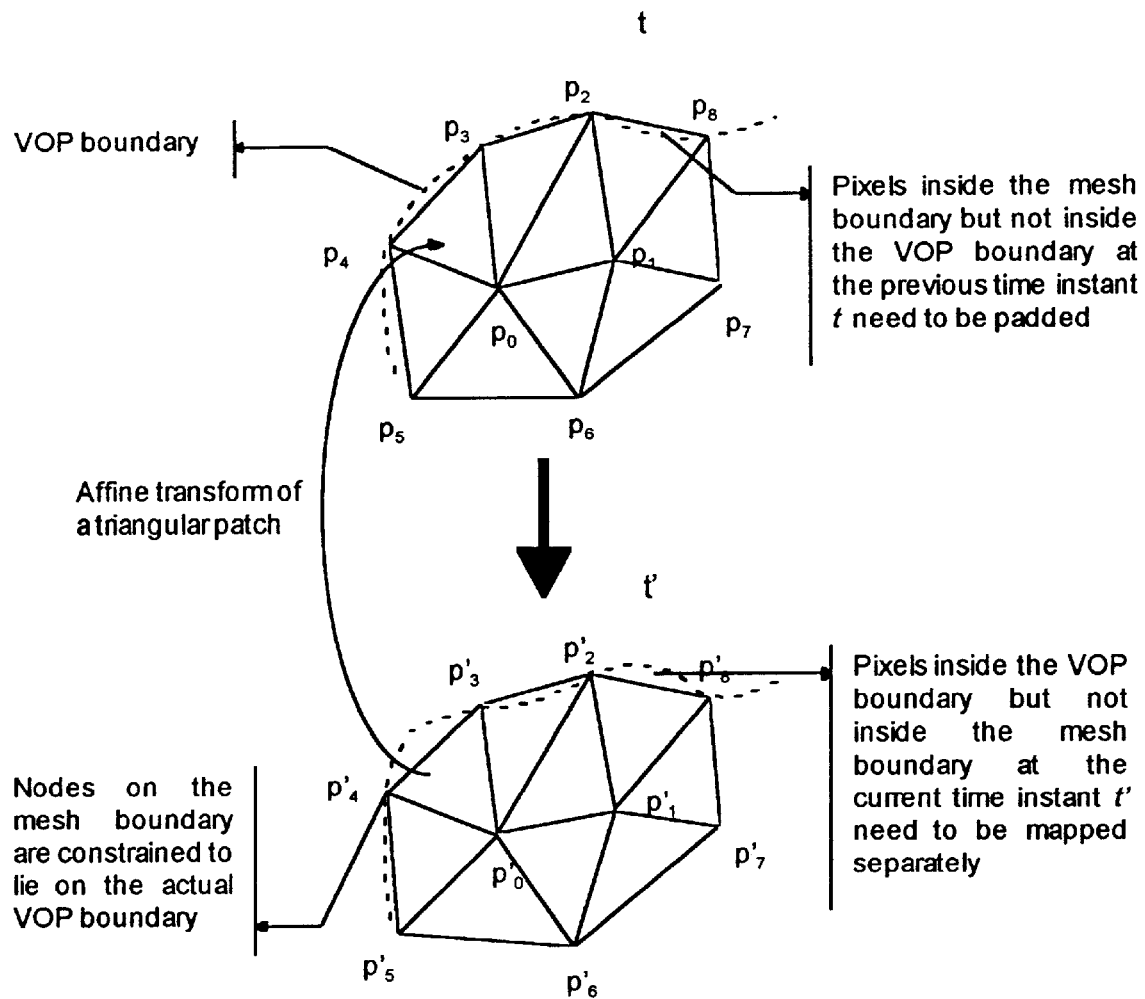
FIG. 5 illustrates details of object-based motion estimation and motion compensation with a forward tracking mesh layer.

In brief summary, FIG. 5 will be understood to illustrate an object-based motion estimation and motion compensation with a forward tracking mesh layer. A small part of the mesh near the video object plane boundary is depicted with solid lines; the actual video object plane boundary is depicted with dashed lines. The nodes on the polygonal mesh boundary must always fall exactly on the actual video object plane boundary; they are allowed to move along this boundary. The interior nodes of the mesh are allowed to move to locations inside the mesh boundary. Motion compensation of pixels inside each triangular patch of the mesh is performed according to an affine transform, defined by the three point correspondences of its nodes. Pixels in areas inside the mesh boundary but not inside the VOP boundary or vice versa need additional processing; either by padding or by separate mapping.

After motion estimation, each node $\vec{p}_n$ has a motion vector $\vec{v}_n$. We employ a post-processing algorithm to preserve the connectivity of the patches. This post-processing enforces the general constraint on mesh topologies that edges between node points are not allowed to cross each other and triangles may not be flipped.

Mesh-based VOP Warping

In applications of the mesh-based motion tracking algorithm, such as video manipulation and video compression, a warping step is applied to map pixels from one VOP to another. To this effect, each triangular patch is warped from the previous VOP to the current VOP using the estimated node motion vectors. Note that prior to the warping, the image containing the previous VOP is padded, in case some area of triangles in the previous VOP falls outside the actual VOP region, see FIG. 5. For each triangular patch, the three forward node point motion vectors determine uniquely a backward affine transform from the current to the previous frame. Then, all pixels (x',y') within the patch of the current VOP are motion compensated from the previous VOP by using the affine transform to compute the corresponding location in the previous VOP (x,y). Bilinear interpolation is used when the corresponding location (x,y) in the previous VOP is not a pixel location.

Note that some pixels in the current VOP may fall outside the mesh that models the current VOP, because the boundary of the mesh is only a polygonal approximation to the true boundary, see FIG. 5. These pixels exterior to the mesh but inside the VOP need to be motion compensated as well. Each of these pixels is motion compensated by computing a motion vector derived from the mesh boundary node motion vectors. This motion vector is estimated by interpolating the motion vectors of the two nearest nodes on the polygonal mesh boundary. This is done by inverse-distance-weighted interpolation of these two motion vectors.

Accordingly, while the present invention has been shown and described with reference to the foregoing preferred methods, it will be apparent to those skilled in the art that other changes in form and detail may be made therein without departing from the spirit and scope of the invention as defined in the appended claims.

We claim:

1. A method for mesh-based representation of the motion of different arbitrary shaped Video Objects, the method comprising the steps of:
representing and processing each Video Object independently from other Video Objects with a given Alpha Plane of a Video Object Plane utilized in design of a mesh.

2. A method for tracking the node points of an object-based mesh, the method comprising the steps of:
defining Video Object Plane boundaries by Alpha planes which are known at every frame; and
constraining motion vectors of node points on a mesh boundary of the object-based mesh to lie along the Video Object Plane boundary at every frame.

3. An improved method for constraining mesh boundary nodes along a Video Object Plane boundary, the improvement comprising restricting search space for new node locations during motion vector estimation such that an order of the nodes along a polygonal mesh boundary is not allowed to change.

4. An improvement to video data compression methods for processing successive video frames to code video object plane shape, motion and texture where the processing includes block-based motion data processing, the improvements comprising: Replacing the existing block-based motion data processing by a layer of mesh-based motion data processing, wherein the mesh-based motion data processing is performed in accordance to mesh-based motion data processing criteria.

5. An improvement to video data compression methods for processing successive video frames to code video object plane shape, motion and texture where the processing includes block-based motion data processing, the improvement comprising: Adding a layer of mesh-based motion data processing to the existing block-based motion data processing, wherein the mesh-based motion data processing is performed in accordance to mesh-based motion data processing criteria; and the block-based motion data processing is performed in accordance to block-based motion data processing criteria.

6. A method for tracking of the node points along Video Object Plane boundaries for a case I, the method comprising the steps of:
assuming the Video Object Plane boundaries to be known at every frame; and
constraining motion vectors of nodes along a boundary to lie along a same Video Object Plane boundary at a next frame by restricting search space.

7. In connection with a video coding method for tracking node points of a video object plane along the video object plane boundaries known at every frame, the improvement comprising:
constraining the motion vectors of nodes along the boundary to lie along the same video object plane boundary at the next frame, thereby restricting the search space in a predefined way.

8. The method of claim 7, wherein said search space is restricted for those nodes that define the mesh boundary at the next frame that lie at the Alpha plane boundary matching those at the present frame.

9. An improvement to data compression methods for processing successive video frames to code video object plane motion and texture where the processing includes block-based motion data processing, the improvement comprising:
adding a layer of mesh-based motion data processing to the existing block-based motion data processing, wherein the mesh-based motion data processing distinguishes between a first case I whereby at least one video object plane is defined by chroma-key sequences;
processing mesh-based motion data in accordance with mesh-based motion data processing criteria; and
processing block-based motion data in accordance with predefined block-based motion data processing criteria.

* * * * *